United States Patent
Yamazaki et al.

(10) Patent No.: US 6,400,466 B1
(45) Date of Patent: Jun. 4, 2002

(54) STORAGE MEDIUM, SYSTEM AND METHOD FOR IMAGE FORMING AND COPYING

(75) Inventors: Tsutomu Yamazaki; Hideyuki Kanbayashi, both of Sagamihara; Toshikazu Kawaguchi, Kobe; Tadashi Ohira, Itami, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/163,686

(22) Filed: Sep. 30, 1998

(30) Foreign Application Priority Data

Oct. 3, 1997 (JP) .............................................. 9-271400

(51) Int. Cl.⁷ .............................................. G06K 15/00
(52) U.S. Cl. ...................................... 358/1.6; 358/1.18
(58) Field of Search ............................... 358/1.18, 1.17, 358/1.16, 1.6, 400, 404, 444, 468, 474

(56) References Cited

U.S. PATENT DOCUMENTS

| | | | | |
|---|---|---|---|---|
| 4,809,216 A | * | 2/1989 | Lai | 364/900 |
| 5,396,341 A | * | 3/1995 | Takahashi et al. | 358/400 |
| 5,901,254 A | * | 5/1999 | Iguchi et al. | 382/298 |
| 6,023,351 A | * | 2/2000 | Newman | 358/524 |
| 6,075,928 A | * | 6/2000 | Kitada et al. | 395/114 |
| 6,151,457 A | * | 11/2000 | Kawamoto | 399/9 |
| 6,271,929 B1 | * | 8/2001 | Zhao | 358/1.18 |

FOREIGN PATENT DOCUMENTS

| | | | | |
|---|---|---|---|---|
| JP | 09-046464 | 2/1997 | | H04N/1/00 |
| JP | 09-238209 | 9/1997 | | H04N/1/00 |

* cited by examiner

*Primary Examiner*—Jerome Grant, II
(74) *Attorney, Agent, or Firm*—Sidley Austin Brown & Wood LLP (57) ABSTRACT

A copying system consisting of a scanner and a printer which are directly connected, including a printer controller controlling a printer engine based on data received from an external computer via a network line, an interface switching unit switching the occupancy of the printer engine between the printer controller and the scanner, and a controller that makes the printer controller occupy the printer engine by means of controlling the interface switching unit when a trouble occurs while the printer engine is occupied by the scanner.

21 Claims, 8 Drawing Sheets

STORAGE MEDIUM, SYSTEM AND METHOD FOR IMAGE FORMING AND COPYING

BACKGROUND OF THE INVENTION

1. Field of the Invention

The present invention relates to a storage medium, a system and a method for image forming and copying, in particular, a copying system comprising a scanner and a printer connected together, and a printer that receives image data sent by an external device such as scanners.

2. Description of the Related Art

Equipment such as printers, scanners, copying machines and facsimile machines, for outputting or reading images on recording papers is an indispensable element of today's typical office environment.

In most cases, each of these devices has been constituted independently. Each of these devices also has built-in units that can be used commonly with other devices. For example, a printer that is connected to a computer and prints out an image on a sheet of paper is equipped with a unit (called printer engine) that is responsible for forming images on the sheet of paper, while a copying machine or a facsimile machine also is equipped with a similar printer engine. On the other hand, a copying machine and a facsimile machine has a unit that scans images, which functions in a similar manner as a scanner connected to a computer.

In recent years, noting the commonality between these built-in units of these devices, manufacturers have introduced compound machines that integrate these units, in other words, the machines that can be used as copying machines, printers, scanners, and facsimile machines.

Such a compound machine takes up less floor space, because it is a single machine, compared to installing multiple devices independently, and is more efficient in terms of replacement of consumable items and equipment maintenance, thus providing a highly useful tool. The problem, however, is that it is still expensive. There is also a need for using only a portion of the functions in common; moreover, under a certain situation, it may be more convenient to use individual devices separately. For example, it is conceivable that a user may want to connect a printer and a scanner, which have been purchased separately, to form a copying machine.

By executing a piece of software that allows an image, which is taken into a system by a scanner, to be printed by a printer via a network line or a computer that connects said printer and scanner, they can function as a copying machine. However, the feeling one gets from such a system is fairly distant from the feeling one gets from a normal copying machine and the system may not be as easy to use as a typical copying machine.

In other words, in order to use such a combination of equipment as a copying machine, it is preferable if it can be used to make copies of documents by simply operating the scanner's keys, similar to operating a typical copying machine, by means of directly connecting the printer with the scanner without the involvement of the computer. This also means all improvement of the printer's general-purpose properties.

One way of connecting a printer directly to a scanner (or other external device) is to install a controller that controls the printer engine of the printer into the scanner, so that the scanner can control the printer engine directly to print out images scanned by the scanner.

In the above case, in order for the printer controller of the printer to properly understand the exchange of status information between the scanner and the printer engine, so that it can respond correctly, another software program is required. For example, when the scanner is in control of (occupying) the printer engine, it can be handled simply by a program that prevents the status information of the printer engine from being sent to the printer controller.

However, there are more problems to be solved when the printer and the scanner are directly connected.

For example, when the scanner is occupying the printer engine and the printer controller is being prevented from receiving the printer engine status information, the printer controller is unable to receive any information regarding troubles happening in the printer engine. This causes problems for the printer controller in using the printer. For example, since the printer controller maintains the status immediately before it is switched to the scanner, it considers that the printer engine is normal even if the printer engine has problems. Thus, it may keep accepting job reservations based on the printer server's queuing, causing overflowing errors as a result.

SUMMARY OF THE INVENTION

One purpose of the present invention is to make it possible for the printer controller to identify a trouble that occurs in the printer engine during printing operation in a copying system consisting of a printer and a scanner connected directly, or in a printer where the printer and a scanner are connected directly to print images.

One aspect of the present invention is a printer comprising: an image forming unit; a first interface that connects the image forming unit with a scanner; a second interface that connects the image forming unit and a network line; and a controller that controls the first and second interfaces and allows the scanner to occupy the image forming unit when an image scanned by the scanner is to be formed by the image forming unit.

Another aspect of the present invention is an image forming system comprising; a network line for data communication; an external device that is connected to the network line and outputs image data; a scanner that scans an original document and outputs image data; and a printer that is connected to the network line and also directly to the scanner, and comprises: an image forming unit, a first interface connecting the image forming unit and the scanner, a second interface connecting the image forming unit and the network line, and a controller that controls the first interface and the second interface and allows the scanner to occupy the image forming unit when an image scanned by the scanner is to be formed by the image forming unit.

Another aspect of the present invention is a copying system with a printer and a scanner directly connected to the printer, the system comprising: an image forming unit provided in the printer; a first interface that connects the image forming unit and the scanner; a printer controller that receives print data from an external device; a second interface that connects the image forming unit and the printer controller; and a controller that controls the first interface and the second interface and allows the scanner to occupy the image forming unit when an image scanned by the scanner is to be formed by the image forming unit.

Another aspect of the present invention is an image forming method comprising the steps of: (a) connecting an image forming unit and a scanner via a first interface and connecting the image forming unit and a network line via a second interface; (b) allowing the scanner to occupy the image forming unit; and (c) forming an image, which is scanned by the scanner, by the image forming unit.

Another aspect of the present invention is a storage medium for storing a control method of a printer with a first interface connecting an image forming unit and a scanner, a second interface connecting the image forming unit and a network line, and a controller that controls the first interface and the second interface, the storage medium storing a first program for allowing the scanner to occupy the image forming unit when an image scanned by the scanner is to be formed by the image forming unit.

The objects, features, and characteristics of this invention other than those set forth above will become apparent from the description given herein below with reference to preferred embodiments illustrated in the accompanying drawings.

DETAILED DESCRIPTION OF THE PREFERRED EMBODIMENT

The embodiments of this invention will be described below with reference to the accompanying drawings.

Figure 1:
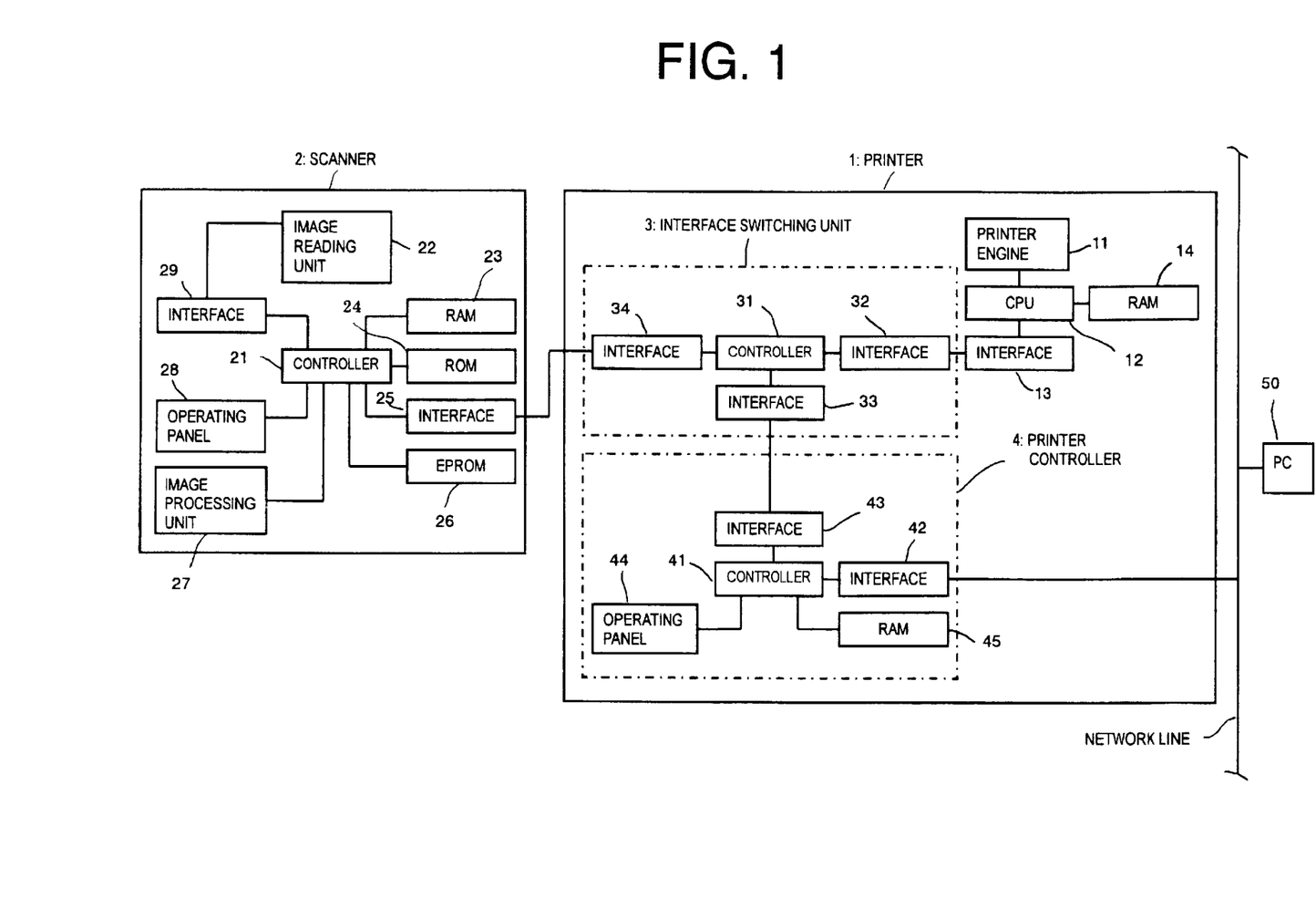
FIG. 1 is a block diagram of the constitution of a copying system according to the first embodiment.

FIG. 1 is a block diagram of the constitution of a copying system according to the first embodiment. The copying system comprises a printer 1 that forms images on a sheet of paper and a scanner 2 that scans the original image.

The printer 1 is connected directly to the scanner 2 via an internally installed interface switching unit 3. As this copying system prints out the image scanned by the scanner 2, it achieves the same result as a copying machine. The printer 1 is connected via printer controller 4 to an external computer (PC) 50, which is a personal computer or a printer server, and receives print data to print from the computer 50.

The printer 1 comprises a printer engine 11, which is a printing means for forming images, a CPU 12 that controls the printer engine 11 by outputting the image data received via interface 13 to the printer engine 11, and a RAM 14 that is used by the CPU 12 to control the system.

The CPU 12 detects by means of various sensors (not shown) any troubles that are generated in the printer engine 11 while the printer engine 11 is being controlled; and responds to the polling by the scanner 2 or the printer controller 4 to output the trouble information as the status of the printer engine 11.

The printer engine 11 is similar to the image forming unit used on conventional electro-photographic copying machines or printers capable of color printing, so that detailed description is skipped here. The printer engine 11 comprises a photosensitive drum, a laser device for forming electrostatic latent images on the photosensitive drum based on image data to which image processing has been applied, a developing device, a toner cartridge, and a controller that controls all of these.

The printer controller 4 of the printer 1 is controlled by the controller 41, receives the print data via an interface 42 from the network line to which the external computer 50 is connected, and the print data is outputted to the printer engine 11 via the interface switching unit 3. If the print data is postscript data, it is stored in a RAM 45 first and then converted into a bitmap data to be outputted to the printer engine 11 via the interface switching unit 3. The controller 41 inside the printer controller 4 is in charge of this control in that it controls the signal exchange between the system and the computer 50 via the network line, polls the CPU 12 that controls the printer engine 11 via the interface switching unit 3, receives the status information of the printer engine, and sends the current status of the printer to the computer 50. The controller 41 also controls an operating panel 44 provided on the main unit of the printer 1. The exchange of the signal of the system with the interface switching unit 3 is conducted via an interface 43.

The printer controller 4 can be installed not inside the printer 1 but outside of it. For example, when the printing is controlled by the printer server provided on the network line, the printer server functions as the printer controller.

The interface switching unit 3 of the printer 1 is an occupancy control means for switching the occupancy of the printer engine 11 in response to the print instruction of the scanner 2 or the print instruction of printer controller 4. The interface switching unit 3 comprises an interface 32 provided for the signal exchange with the CPU 12 of the printer engine 11, an interface 33 provided for the signal exchange with the printer controller 4, an interface 34 provided for the signal exchange with the scanner 2, and a controller 31 for controlling the switching of signal flow through each interface.

The controller 31 connects the interface 33 and the interface 32 by switching the signal route so that the printer controller 4 can always make an access to the CPU 12 of the printer engine 11 when there is no signal from the scanner 2, for example, when there is no signal from the scanner 2 to occupy the printer engine 11, or when the scanner is not connected. If there is a signal input from the scanner 2, it connects the interface 34 with the interface 32 by switching the signal route so that the scanner 2 can occupy the printer engine 11.

The scanner 2 is a so-called color digital scanner and scans the original image in color. The scanner 2 comprises a controller 21 that controls the scanner main unit, an image reading unit 22 that scans the original image, a RAM 23 that stores the scanned image data temporarily, a ROM 24 that stores the control program and the necessary data, a video interface 25 for sending the image data to the printer engine 11, an EPROM 26 for storing the initial setting, color reproduction data and the total count of copies made, an image processing unit 27 that handles image processing such as gamma compensation and enlargement and reduction of the scanned image and converts color data, an operating panel 28 for instructing or entering scanning or copying operations, and a SCSI interface 29 for exchanging the control signals including the image data between the image reading unit 22 and the controller 21 as well as for directly connecting the scanner and the computer.

The controller 21 is in charge of issuing the instruction output to the controller 31 of interface switching unit 3 for switching the occupying condition of the printer engine 11 by means of the processing to be described later and performing the function of the status information exchange control unit in coordination with the controller 31 in addition to the control of the scanner itself including the resolution change process to convert the resolutions of the image data scanned by the image reading unit 22 and the image data stored in the RAM 23, the communication control of the SCSI interface 29 and the video interface 25, and the control of the operating panel 28.

Similar to the units provided in conventional copying machines and scanners, the image reading unit 22 comprises a CCD sensor that scans the original document, the light source that illuminates the original surface, and an automatic feeding device (not shown) that automatically feeds multiple sheets of paper, one sheet at a time, to the image scanning position (the document table, the CCD sensor position, etc.). The image reading unit 22 scans the original image by means of the CCD sensor and outputs the image data divided into three colors, red, blue and green.

The image processing unit 27 is in charge of gamma compensation, edge enhancement, smoothing, identification between characters and photograph regions, enlargement and reduction of the image, and conversion of the three color image data, i.e., the red, blue and green color data into the four color data, i.e., yellow, cyan, magenta and black color data, that can be handled by the printer.

Next, let us describe the occupancy switching action of the printer engine 11 by the scanner 2.

Figure 2:
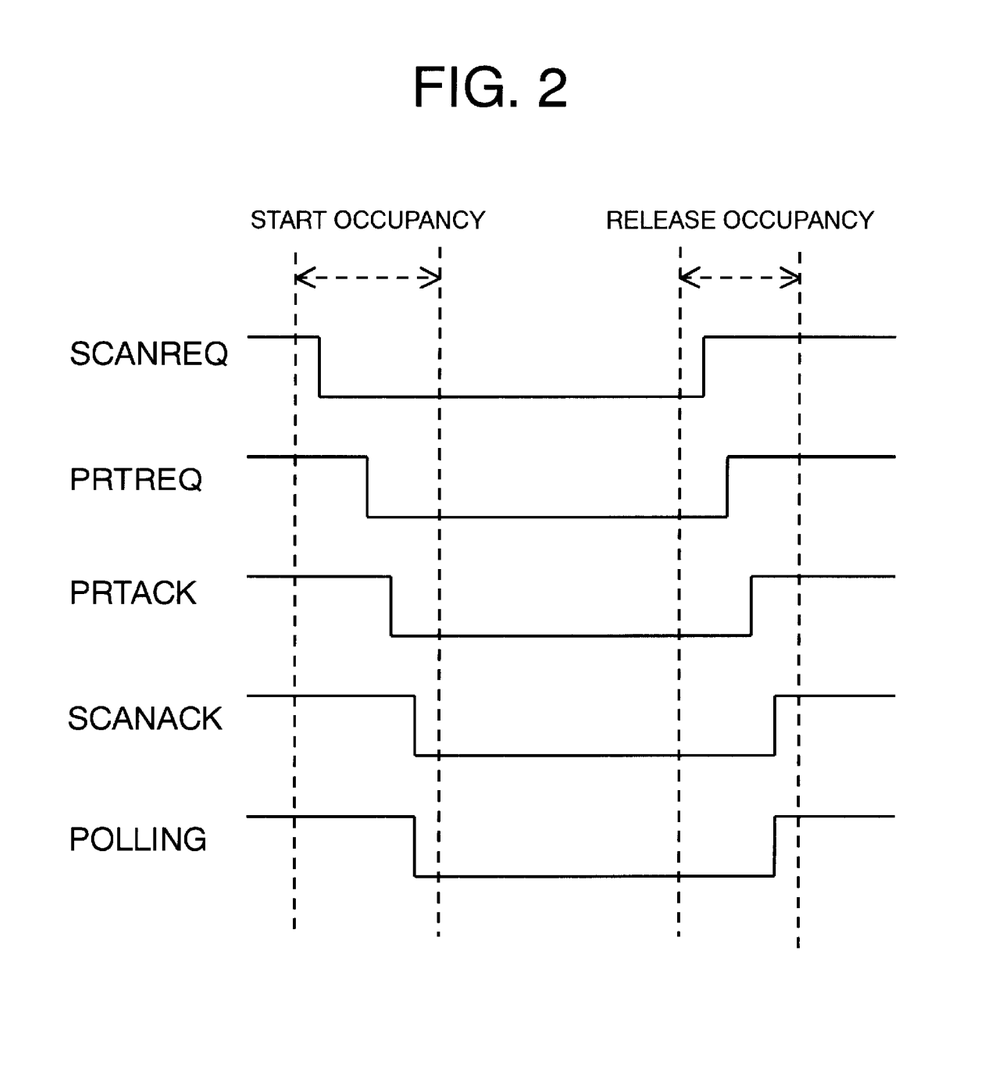
FIG. 2 is a chart of the signal status during the start or release of the occupancy by the scanner.

FIG. 2 is a chart of the signal condition of the signals issued by the scanner 2 and the interface switching unit 3 for switching the occupancy by the scanner. In FIG. 2, the high side is the inactive and the low side represents the active conditions.

When the scanner is occupying the printer engine, the controller 21 of the scanner 2 turns a signal, SCANREQ, that requests the occupancy of the printer engine issued to the controller 31 of the interface switching unit 3 active. Receiving the SCANREQ signal, the controller 31 of the interface switching unit 3 turns a signal, PRTREQ, that requests the release of the printer engine issued to the controller 41 of the printer controller 4 active.

Receiving the PRTREQ signal, for example, if printing has not been executed and the printer engine is in a releasable state, the printer controller 4 turns a signal, PRTACK, that indicates the release of the printer engine issued by the controller 41 to the interface switching unit 3 active.

Receiving the PRTACK signal, the controller 31 of the interface switching unit 3 turns a signal, SCANACK, that allows the occupancy that is issued to the scanner 2 active. On the other hand, the interface switching unit 3 changes the occupancy of the printer engine 11 from the printer controller 4 to the scanner 2.

The controller 31 of the interface switching unit 3 confirms that the above signals (SCANREQ, PRTREQ, PRTACK, SCANACK) have turned active. The printer controller 4 turns a signal, POLLING, that judges whether the polling can be done active. When it is activated, the polling signal POLLING prohibits the polling of printer engine 11 by the printer controller 4.

When the POLLING signal turns active, the controller 41 of the printer controller 4 stores the status information immediately prior to that in the RAM 45 and interrupts the polling of the printer engine 11. When the printer controller 4 receives a query about the printer status by the computer 50 after the polling has been interrupted, it responds to the query with the printer status based on the status information stored in the RAM 45. Therefore, if the status immediately prior to the prohibition of the polling by the printer controller 4 to the printer engine 11 was normal, it reports a print waiting status in response to the print request. At this point, the computer 50 accepts the job registration.

In the meanwhile, the scanner 2 recognizes the fact that it has occupied the printer engine 11, in other words, it is ready to print out the scanned image, when it learns that the SCANACK signal is turned active as a result of changing the SCANREQ signal active.

The releasing action of the scanner 2 is opposite to the above.

With reference to FIG. 2, when the controller 21 of the scanner 2 turns the SCANREQ signal inactive, the controller 31 of the interface switching unit 3 turns the PRTREQ signal that is issued to the printer controller 4 inactive. As a result, the controller 41 of the printer controller 4 turns the PRTACK signal that initiate the occupancy inactive. Learning that the PRTACK signal has turned inactive, the controller 31 of the interface switching unit 3 notifies to the scanner 2 that the printer engine occupancy has been released as the signal SCANACK is turned inactive. The interface switching unit 3 switches the occupancy status of the printer engine 11 from the occupancy by the scanner to the occupancy by the printer controller. At the same time, it turns the POLLING signal to the printer controller 4 inactive. The controller 41 of the printer controller 4 recognizes that the polling is now enabled and restarts the polling of the printer engine 11, which has been interrupted, and inquires the printer engine 11 of its status at a fixed interval thereafter.

The scanner 2 thereafter turns into a print out waiting status, while the printer controller 4 becomes possible to exchange signals with the CPU 12 of the printer engine 11.

As described above, when a trouble occurs in the printer engine, it becomes possible to switch the occupancy state depending on the trouble situation from the scanner controller, so that the printer engine can be polled by the printer controller. Therefore, even if a trouble occurs in the printer engine while the scanner is occupying the printer engine and the signal from the printer controller cannot be accepted by the printer engine, the printer controller as well as the scanner can recognize that there is a trouble in the printer. The scanner's control operation including the control during a trouble is described in the following.

Figure 3A:
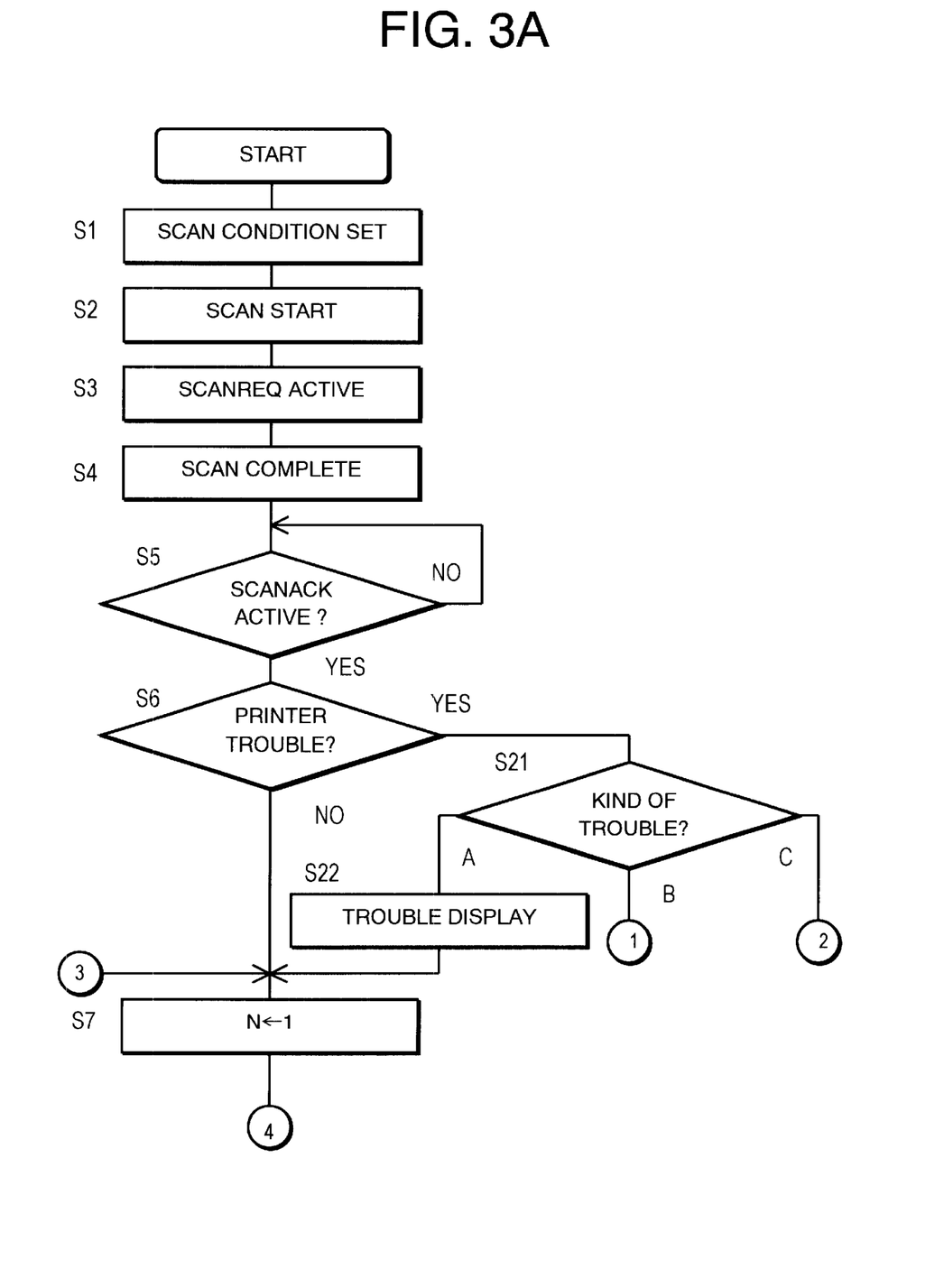
FIGS. 3A–3C are flow charts of the scanner control.
Figure 3B:
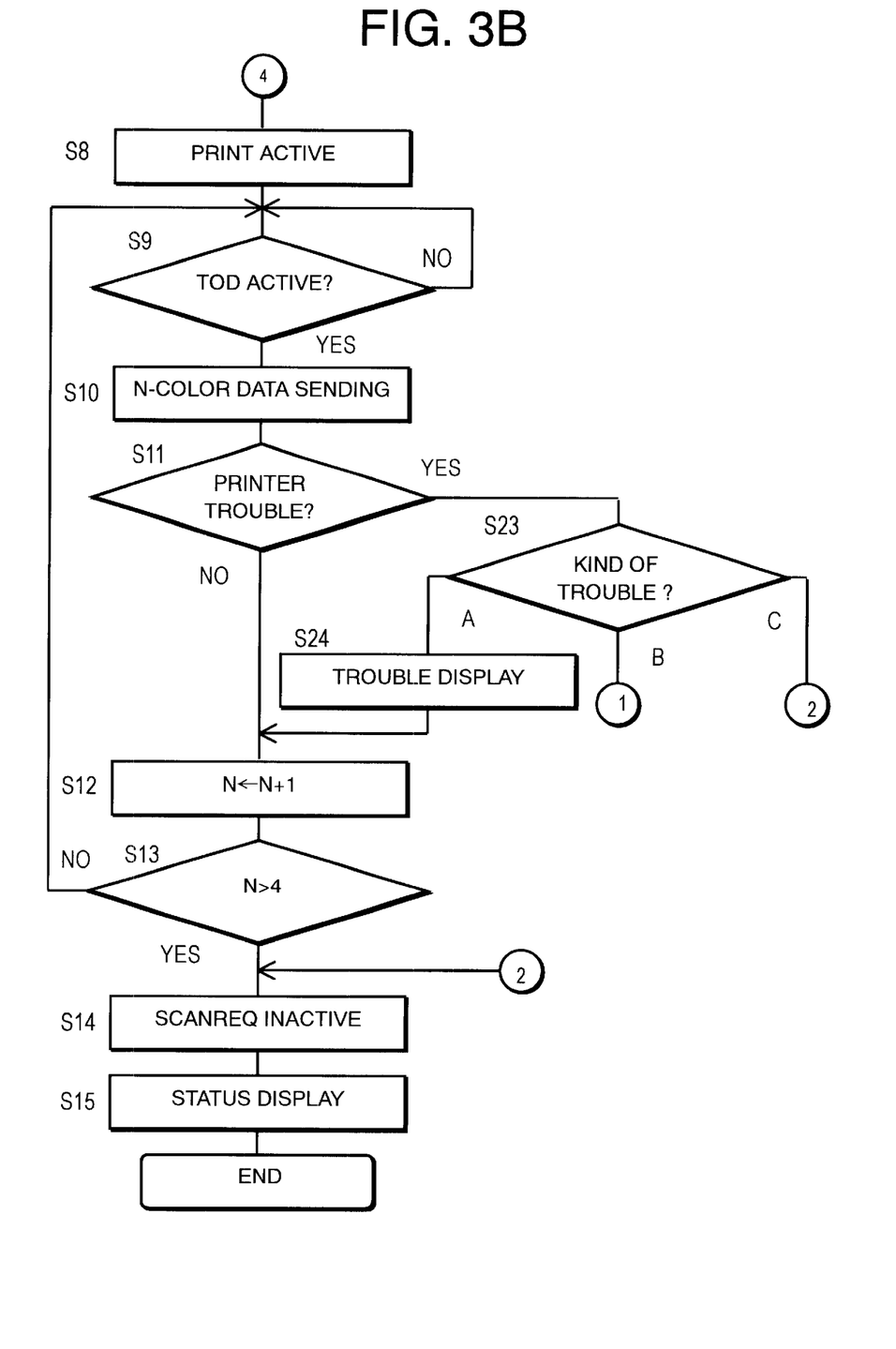
Figure 3C:
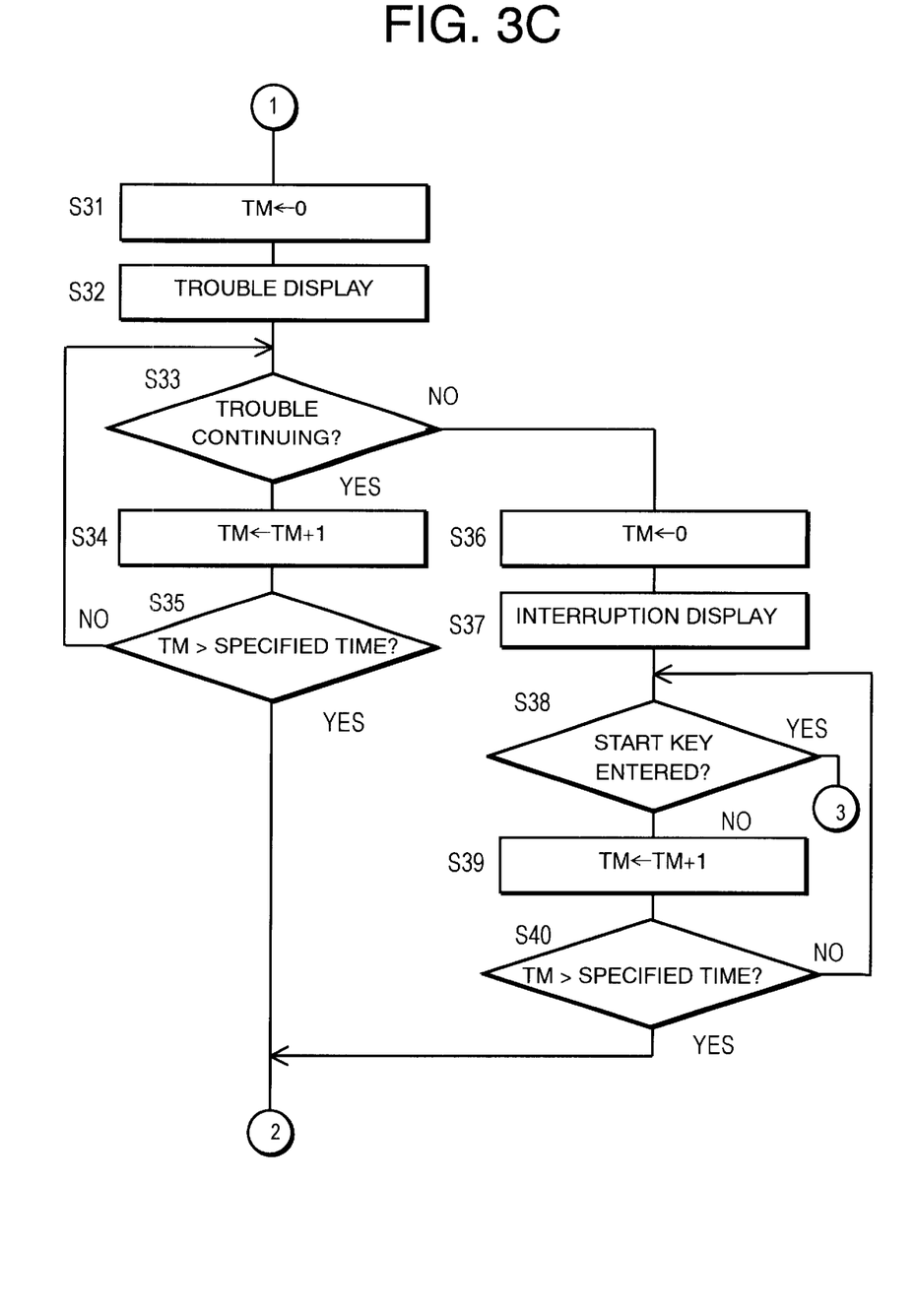

FIGS. 3A–3C are flow charts of the operating sequence of the scanner 2.

As the original document is set on the scanner 2, the scanning conditions such as the exposure condition and the scan speed are entered from the operating panel (S1), and the start key is entered, a scanning process starts to scan the original's image (S2).

The SCANREQ signal for occupying the printer engine 11 is then turned active (S3). When the scanning is completed (S4), it waits for the SCANACK signal to turn active (S5). When the SCANACK signal becomes active, it polls the printer engine 11 to check if it has any trouble (S6).

If there is no trouble, a variable N is set to 1 (S7) and a signal, PRINT, that indicates the print instruction is set active (S8). When a signal, TOD, that allows the print execution is detected to be active (S9), it outputs the image data of N-color (S10). The image data of N-color means the image data of N=1 or yellow, N=2 or cyan, N=3 or magenta, and N=4 or black, respectively.

Next, it checks again if any trouble exists in the printer engine 11 (S11) and the variable N is incremented by 1 (S12). By repeating the steps S9 through S13, until the variable N becomes 4 (S13), all color image data will be outputted to the printer engine 11. In other words, the image scanned by the scanner 2 will be formed on the recording paper by the printer engine 11.

By turning the SCANREQ signal inactive, it releases the occupancy (S14), and displays the printer engine status on the display panel (not shown) of the operating panel 28 (S15). The description so far is the flow of the process when it is operating normally.

On the other hand, if a trouble occurs in the printer engine 11, it will be detected by the step S6 or S11. When the trouble is detected, the type of troubles is identified (S21 or S23).

The kind of troubles is classified into three categories. The first kind of trouble is a very light trouble wherein the printing action can be continued, for example, the toner is nearly empty. Let us call this trouble-A. The second kind of trouble is a minor trouble wherein the printing action cannot be continued but the trouble can be easily fixed by the user, for example, a trouble such as paper jam or out of paper, toner empty, or a consumable item that can be replaced by the user has reached the replacement timing. Let us call this trouble-B. The third kind of trouble is a trouble wherein the printing action cannot be continued and it is unrepairable by the user, for example, a trouble that requires to call a service representative or a consumable item that cannot be replaced by the user has reached the replacement timing. Let us call this trouble-C.

If the type of trouble judged at the step S21 or S23 turns out to be a trouble-A or very minor, the trouble status will be displayed (S22 or S24), and it returns to the step S7 or S12 in order to continue the process.

If the type of trouble judged at the step S21 or S23 turns out to be trouble-B (FIG. 3C), a timing variable TM will be set to zero (S31) and the trouble status will be displayed (S32). Next, it is judged whether the trouble is continuing or if it has been fixed by the user (S33). If it hasn't been fixed, the timing variable TM is incremented by 1 (S34) and checked if it has passed a predetermined time (S35); if it hasn't passed the predetermined time, it returns to the step S33.

When it is determined at the step S35 that the trouble still exists after the predetermined time has passed, it proceeds to the step S14 and the SCANREQ signal is turned inactive in order to release the occupying status of the printer engine. Next, the status of the printer engine is displayed (S15). This will enable the polling of the printer controller 4 and also enable the detection of the printer engine trouble.

On the other hand, if the trouble is judged to be settled at the step S33, it resets the timing variable TM to zero (S36) and displays that it has stopped to prompt the user to reenter the start by pressing the start key in order to continue the process from the mid point (S37). When the start key is pressed (S38), it returns to the step S7 and restarts the image forming of the page from the beginning. If there is no start key input at the step S38, it increments the timing variable TM by 1 (S39), makes a judgment if a specified time has passed (S40), and returns to step S38 if it has not passed the time. In other words, wait for the start key input for the specified time. If no start key input is made within the specified time, it proceeds to the step S14 and set the signal SCANREQ inactive in order to release the occupancy of the printer engine. Next, it displays the printer engine status S15). This enables the polling of the printer controller 4 and the detection of the printer engine status.

This means that, if the user succeeds in fixing the trouble and restarting within a certain period during which the occupancy of the printer by the scanner 2 is maintained by means of the steps S33 through S40, the printing process can resume. On the other hand, if the repairable trouble remains unfixed and thus restarting signal is not entered for a long time, the user of another computer which is connected to the printer controller 4 can recognize this situation, so that the user can fix the trouble and make it usable as a printer.

Next, if the trouble is determined at the step S21 or S23 to be a trouble-C or a trouble that cannot be repaired by the user, it proceeds to the step S14 and releases the occupancy of the printer engine, turning the SCANREQ signal inactive. It then displays the status of the printer engine (S15). In other words, the occupancy of the printer engine 11 is quickly released, so that the user can recognize that the printer controller 4 developed a serious trouble.

Due to the process described above, the printer controller 4 is enabled to poll as the occupancy of the printer engine 11 by the scanner 2 is released when a trouble occurs.

However, it is also possible to configure the system in such a way as to allow only the polling by the printer controller 4 without releasing the occupancy of the printer engine 11 by the scanner 2. Namely, when a trouble occurs, instead of releasing the occupancy of the printer engine 11 by the scanner 2, the interface switching unit 3 is instructed to set only the POLLING signal inactive, while maintaining the SCANREQ, PRTREQ, PRTACK and SCANACK signals active as shown in FIG. 2.

Next, let us describe the polling action of the printer controller.

Figure 4:
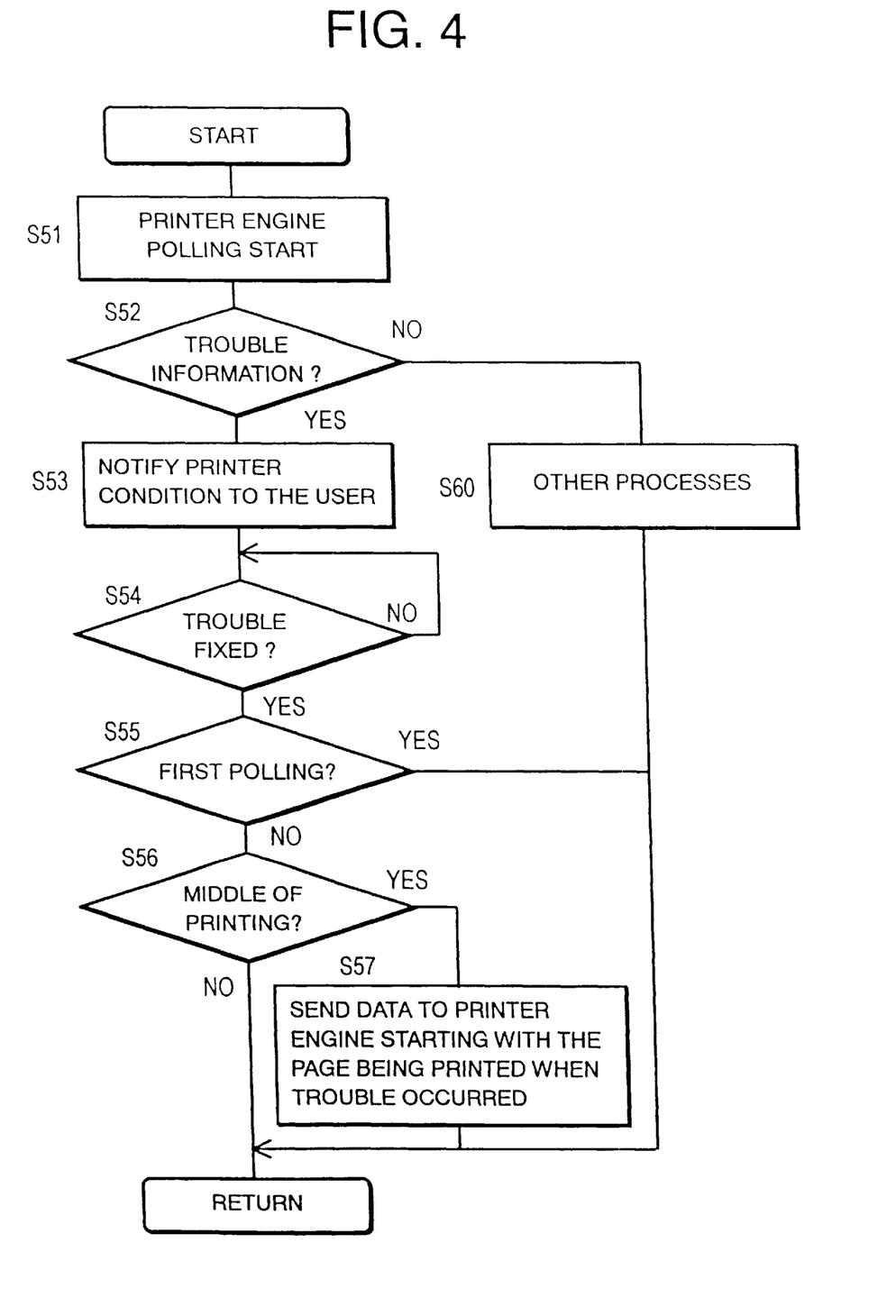
FIG. 4 is a flow chart of polling processes by the printer controller.

FIG. 4 is a flow chart of the sequence of the polling action conducted by the controller 41 of the printer controller 4. It is assumed here a situation wherein the POLLING signal issued by the interface switching unit 3 to the printer controller 4 is inactive, for example, a situation wherein the printer engine 11 is occupied by the printer controller 4 from the beginning, or a situation wherein the occupancy of the printer engine 11 by the scanner 2 is released, thus being enable to be polled, or a situation wherein only the polling is enabled due to the occurrence of a trouble.

First, the CPU 12 that controls the printer engine 11 is polled (S51). It judges if there is any trouble based on the status reported in response to the polling (S52). If there is not trouble information, it switches to other processes such as normal printing process (S60).

On the other hand, if there is trouble information at the step S52, the trouble status of the printer is sent to a device connected via the network line such as the computer 50 in order to inform the user of the trouble information (S53). The information being sent here contains only the description of the process regarding the connected device, and does not contain any other information obtained from the printer engine simultaneously such as the page number when the printer became incapacitated.

Next, it judges whether the trouble is still continuing (S54). When the trouble is eliminated, it judges whether the current polling is the first time or not (S55). The procedure at the step S55 is intended to judge whether the trouble occurred when the printer was occupied by the scanner 2 or during the print control by the printer controller 4.

If it is judged at the step S55 that it was the first polling, it means that it was not operating as a printer so that it returns to the normal operating routine and waits for the next operation instruction. On the other hand, if it is judged at the step S55 that it was not the first polling, it further determines whether it was in the middle of printing (S56). If it determines at S56 that it was in the middle of printing, the image data are outputted again to the printer engine 11 in sequence starting with the image data of the page where the trouble occurred in order to restart printing from the page where the trouble occurred based on the information contained in the status report obtained from the printer engine such as the number of pages that were failed to be printed due to the trouble (S57).

In the first embodiment, as shown above, if a trouble occurs while the scanner is occupying the printer engine and the trouble is not fixed, or if a serious trouble occurs, the printer controller can recognize the trouble. Therefore, it is possible to notify the user of the computer about any development of the printer trouble even when the printing is executed under the instructions of the computer. Therefore, it does not cause an overflow of the printing job reservations due to the inability of execution of the printing jobs by the computer user when a trouble occurs. Moreover, if a repairable trouble is left unfixed by the scanner user for a specified time, the trouble information will be sent to the printer controller, so that the computer user can be advised that the system can be used as a printer so along as the trouble is fixed.

Furthermore, in the first embodiment, the occupancy switching is done by the scanner. As a result, the printer needs only a simple signal route switching function to switch the occupancy of the printer engine according to the control signal from the scanner. Namely, it can be constructed by simply adding to a conventional printer a switching device with a relatively simple function and construction, so that the cost increase of the printer itself can be held minimum. For example, if a user wants to purchase a printer only in the beginning and retrofit a copying machine feature later, the initial investment of the printer purchase can be relatively small.

The printer according to the second embodiment of the present invention is constituted in such a way that the occupancy switching can be handled inside the printer when a trouble occurs and is equal to the printer according to the first embodiment except the control function of the interface switching unit 3. The following description discusses only the control procedure inside the printer when a trouble occurs. The hardware of this printer to be used to constitute a copying system is the same as the constitution according to the first embodiment, which is shown in FIG. 1.

Figure 5:
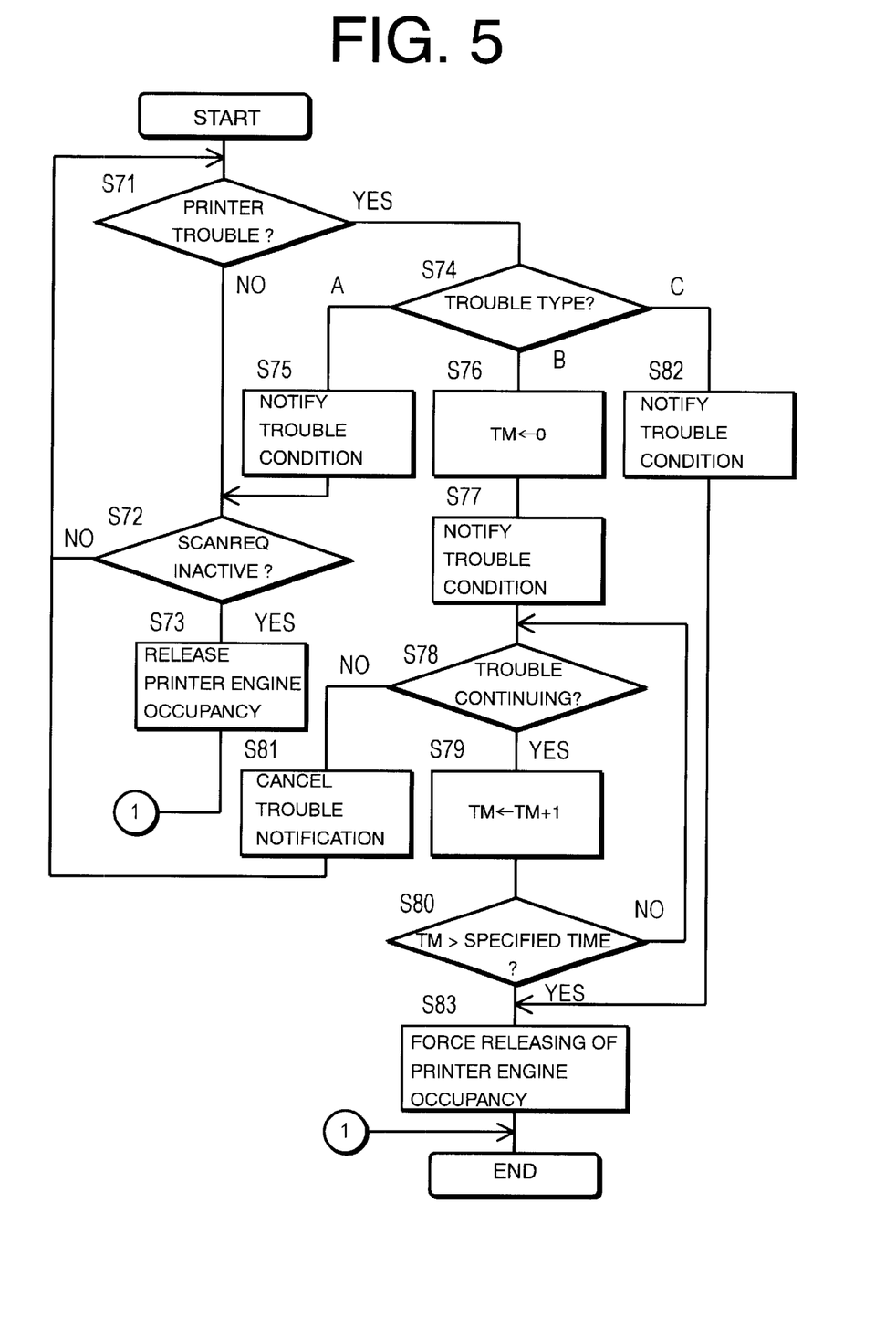
FIG. 5 is a flow chart of the control of the interface switching unit according to the second embodiment.

FIG. 5 shows a flow chart of the control operation of the controller 31 of the interface switching unit 3 after the occupancy of the printer engine 11 is switched to the scanner 2 based on the occupancy request by the scanner 2.

First, the system checks if there is any trouble in the printer engine 11 after its occupancy by the scanner 2 has started (S71). If it is determined that there is no trouble at S71, the occupancy state is maintained until the SCANREQ signal from the scanner 2 becomes inactive (S72), and the occupancy is released when the SCANREQ signal becomes inactive (S73). This occupancy release is a normal release and is similar to the case of the first embodiment described in reference to FIG. 2.

If it is determined that a trouble has occurred at the step S71, the kind of trouble occurred is judged (S74). Incidentally, the troubles are divided into three categories as in the first embodiment, i.e., trouble-A which is a minor trouble wherein the printing can be continued, trouble-B wherein the printing cannot be continued but the trouble can be fixed by the user, and trouble-C wherein the printing cannot be continued and the trouble cannot be fixed by the user.

If the system determines at the step S74 that the trouble is a trouble-A that allows the printing operation to be continued, it notifies the scanner 2 what kind of the trouble it is (S75), proceeds to the step S72, and the occupancy by the scanner 2 continues. Receiving the trouble notification, the scanner 2 outputs a display, which corresponds to the kind of the trouble notified, on the display panel of the operating panel 28.

If it is determined at the step S74 that the trouble is a trouble-B that the user can fix, the timing variable TM will be set to zero (S76) and the trouble status will be reported to the scanner 2 (S77). Next, it is judged whether the trouble is continuing or if it has been fixed by the user (S78).

If it hasn't been fixed at the step S78, the timing variable TM is incremented by 1 (S79). It is then checked if it has passed a predetermined time (S80). If it hasn't passed the predetermined time, it returns to the step S78. If it is determined at the step S80 that the trouble still persists after a specified period, the occupancy of the printer engine is forcefully released (S83). This will enable the polling of the printer controller 4 so that the trouble of the printer engine 11 becomes detectable. The operation of the forceful release at the step S83 will be described in detail later.

On the other hand, if it is determined at the step S78 that the trouble no longer exists, the trouble notice will be cancelled (S81), and it returns to the step S71 and restarts the image forming of the interrupted page from the beginning. Therefore, the trouble display of the scanner 2 will be erased.

If it is determined at the step S74 that the trouble is a serious trouble-C that cannot be fixed by the user, the trouble status will be reported to the scanner 2 (S22), and the occupancy of the printer engine 11 will be forcefully released (S83). Thus, the printer controller 4 becomes capable of recognizing the trouble.

Figure 6:
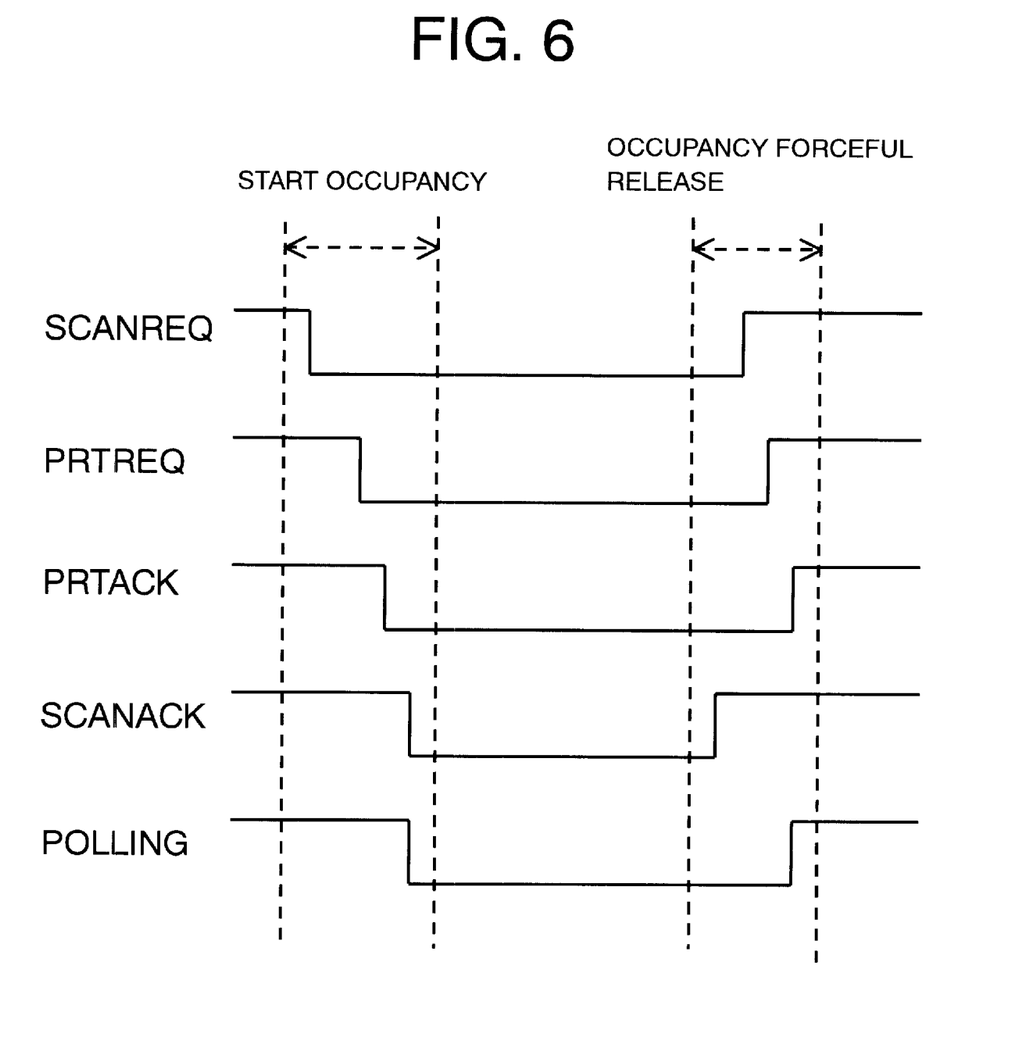
FIG. 6 is a flow chart of the signal status during forced releasing of the occupancy by the scanner.

Next, let us explain the forceful releasing of the printer engine occupancy by the scanner at the step S83 referring to FIG. 6 which shows the status of the signals issued by the scanner 2 and the interface switching unit 3 in order to switch the occupancy. Since the status of the signal prior to the start of the occupancy is the same as FIG. 2 for the first embodiment, only the forceful release of the occupancy condition will be explained in the following.

First, the controller 31 of the interface switching unit 3 turns the SCANACK signal inactive in order to request the release of the occupancy to the scanner 2. In response to the request of the occupancy release, the controller 21 of the scanner 2 turns the SCANREQ signal inactive. When the controller 31 of the interface switching unit 3 detects that the SCANREQ signal has turned inactive, it turns the PRTREQ inactive in order to notify the controller 41 of the printer controller 4 that the printer restored its original condition, i.e., that the printer controller 4 is enabled to occupy the printer engine 11. Detecting that the PRTREQ signal has become inactive, the controller 41 of the printer controller 4 turns the PRTACK inactive in order to show that it is starting the occupancy. The interface switching unit 3 switches the occupancy status of the printer engine 11 from the occupancy by the scanner 2 to the occupancy by the printer controller 4, and also turns the POLLING signal inactive in order to reopen the polling of the printer controller 4. This releases the occupancy of the printer engine 11 by the scanner 2, and enables the printer controller 4 to access the printer engine 11 including its polling.

It is also possible to configure the system to allow the polling only by the printer controller 4 without releasing the occupancy of the scanner 2. In this case, it maintains the SCANREQ, PRTREQ, PRTACK and SCANACK signals active and changes only the POLLING signal inactive.

Thus, in the second embodiment, when a trouble occurs while the scanner 2 is occupying the printer engine 11, the printer controller 4 becomes capable of accessing the printer engine 11 to recognize the trouble by forcefully releasing the occupancy of the printer engine 11 by the scanner 2 by means of controlling the interface switching unit 3.

As described above, when a trouble occurs in the printing means occupied by the scanner, wherein said trouble prevents the operation and is difficult to repair, the embodiment according to the present invention provides a means of reopening the communication between the printer controller and the printing means through a status information exchange control unit to make said printing means trouble recognizable by the printer controller, thus enabling the user of the external device such as a computer, who is trying to use the printer via the printer controller, to realize that the printer is temporarily unusable and to take actions to avoid the overflowing of the print job reservation.

If the trouble can be repaired by the user, the embodiment according to the present invention maintains the occupancy by the scanner, and can continue the print out functioning as a copying system consisting of the scanner and the printer once the trouble is fixed.

If a trouble occurs in the printing means that makes the system inoperable and it is difficult to repair, the embodiment according to the present invention is capable of reopening the communication between the printer controller and the printing means by means of switching the occupancy of the printing means by the scanner to the occupancy by the printer controller, thus enabling the printer controller to recognize the trouble of the printing means without delay, which in turn enabling the user of the external device such as a computer, who is trying to use the printer via the printer controller, to realize that the printer is temporarily unusable.

If a trouble occurs in the printing means that makes the system inoperable but it can be repaired by the user, and the trouble condition persists a long time, for example, the user who is using the copying function of the system does not repair easily repairable trouble, the occupancy of the printing means by the scanner can be released, so that the user of the external device such as a computer, who is trying to use the printer via the printer controller, can recognize the trouble and repair it to make the system usable as a printer.

It is obvious that this invention is not limited to the particular embodiments shown and described above but may be variously changed and modified without departing from the technical concept of this invention. For example, the present invention can be applied to such a format as a film scanner for scanning normal photographic films (35 mm film, film for APS, etc.) or a microfilm scanner for scanning microfilms used for recording images of documents or other types of original documents as photographs though the external device connected to the printer is described as a scanner for scanning the original document in the embodiments 1 and 2.

Further, the entire disclosure of Japanese Patent Application No. 09-271400 filed on Oct. 3, 1997, including the specification, claims, drawings and summary are incorporated herein by reference in its entirety.

What is claimed is:

1. A printer comprising:
    an image forming unit;
    a first interface that connects said image forming unit with a scanner;
    a second interface that connects said image forming unit and a network line;
    a controller that controls said first and second interfaces and allows the scanner to occupy said image forming unit when an image scanned by the scanner is to be formed by said image forming unit; and
    a status information exchange control unit that allows said image forming unit to exchange status information with the scanner, but prohibits said image forming unit to exchange status information with an external device connected to the network line when said image forming unit is occupied by the scanner.

2. A printer according to claim 1, wherein said status information exchange control unit allows said image forming unit to exchange status information with the external device connected to the network line when a trouble occurs in said image forming unit while said image forming unit is occupied by the scanner.

3. A printer according to claim 1, wherein said status information exchange control unit allows said image forming unit to exchange status information with the external device connected to the network line when an inoperable condition of said image forming unit continues for a specified period of time while said image forming unit is occupied by the scanner.

4. A printer according to claim 1, wherein said controller cancels occupancy of said image forming unit by the scanner when a trouble occurs in said image forming unit while said image forming unit is occupied by the scanner.

5. An image forming system comprising:
    a network line for data communication;
    an external device that is connected to said network line and outputs image data;
    a scanner that scans an original document and outputs image data; and
    a printer that is connected to said network line and directly connected to said scanner, and comprises: an image forming unit, a first interface connecting the image forming unit and said scanner, a second interface connecting the image forming unit and said network line, and a controller that controls the first interface and the second interface and allows said scanner to occupy the image forming unit when an image scanned by said scanner is to be formed by the image forming unit,
        wherein said printer further comprises a status information exchange control unit that allows the image forming unit to exchange status information with said scanner, but prohibits the image forming unit to exchange status information with said external device connected to said network line when the image forming unit is occupied by said scanner.

6. A copying system with a printer and a scanner directly connected to the printer, the system comprising:
    an image forming unit provided in the printer,
    a first interface that connects said image forming unit and the scanner,
    a printer controller that receives print data from an external device;
    a second interface that connects said image forming unit and said printer controller;
    a controller that controls said first interface and said second interface and allows the scanner to occupy said image forming unit when an image scanned by the scanner is to be formed by said image forming unit; and
    a status information exchange control unit that allows said image forming unit to exchange status information with the scanner, but prohibits said image forming unit to exchange status information with said printer controller when said image forming unit is occupied by the scanner.

7. A copying system according to claim 6, wherein said status information exchange control unit allows said image forming unit to exchange status information with said printer controller when a trouble occurs in said image forming unit while said image forming unit is occupied by the scanner.

8. A copying system according to claim 6, wherein said controller cancels occupancy of said image forming unit by the scanner when a trouble occurs in said image forming unit while said image forming unit is occupied by the scanner.

9. An image forming method comprising the steps of:
   (a) connecting an image forming unit and a scanner via a first interface and connecting the image forming unit and a network line via a second interface;
   (b) allowing the scanner to occupy the image forming unit,
   (c) forming an image, which is scanned by the scanner, by the image forming unit; and
   (d) allowing the image forming unit to exchange status information with the scanner, but prohibiting the image forming unit to exchange status information with an external device connected to the network line when the image forming unit is occupied by the scanner.

10. An image forming method according to claim 9, wherein the image forming unit is allowed to exchange status information with the external device connected to the network line when a trouble occurs in the image forming unit while the image forming unit is occupied by the scanner.

11. An image forming method according to claim 9, wherein the image forming unit is allowed to exchange status information with the external device connected to the network line when an inoperable condition of the image forming unit continues for a specified period of time while the image forming unit is occupied by the scanner.

12. An image forming method according to claim 9, wherein occupancy of the image forming unit is cancelled by the scanner when a trouble occurs in the image forming unit while the image forming unit is occupied by the scanner.

13. A storage medium for storing a control method of a printer with a first interface connecting an image forming unit and a scanner, a second interface connecting the image forming unit and a network line, and a controller that controls the first interface and the second interface, the storage medium storing a first program for allowing the scanner to occupy the image forming unit when an image scanned by the scanner is to be formed by the image forming unit, and storing a second program for allowing the image forming unit to exchange status information with the scanner, but prohibiting the image forming unit to exchange status information with an external device connected to the network line when the image forming unit is occupied by the scanner.

14. A storage medium according to claim 13, wherein said second program allows the image forming unit to exchange status information with the external device connected to the network line when a trouble occurs in the image forming unit while the image forming unit is occupied by the scanner.

15. A storage medium according to claim 13, wherein said second program allows the image forming unit to exchange status information with the external device connected to the network line when an inoperable condition of the image forming unit continues for a specified period of time while the image forming unit is occupied by the scanner.

16. A copying system including a printer and a scanner directly connected with the printer, said copying system comprising:
   a printer engine for printing an image,
   a printer controller for receiving print data via a network to which an external device is connected and for outputting the print data to the printer engine;
   a first interface for connecting the printer engine with the scanner;
   a second interface for connecting the printer engine with the printer controller; and
   a controller for controlling the first and second interfaces to allow the scanner to occupy the printer engine when an image obtained by the scanner is to be printed by the printer,
      wherein if a trouble which makes the printer engine inoperative occurs, the controller controls the first and second interfaces to release the scanner's occupation of the printer engine so that communication is allowed between the printer engine and the printer controller.

17. A method for use with a copying system including a printer having a printer engine, a scanner directly connected with the printer, a printer controller for receiving print data via a network to which an external device is connected and for outputting the print data to the printer engine, a first interface for connecting the printer engine with the scanner, and a second interface for connecting the printer engine with the printer controller, said method comprising the steps of:
   controlling the first and second interfaces to allow the scanner to occupy the printer engine when an image obtained by the scanner is to be printed by the printer; and
   controlling the first and second interfaces to release the scanner's occupation of the printer engine, if a trouble which makes the printer engine inoperative occurs, so that communication is allowed between the printer engine and the printer controller.

18. A copying system including a printer and a scanner directly connected with the printer, said copying system comprising:
   a printer engine for printing an image;
   a printer controller for receiving print data via a network to which an external device is connected, and for outputting the print data to the printer engine;
   a first interface for connecting the printer engine with a scanner;
   a second interface for connecting the printer engine with the printer controller; and
   a controller for controlling the first and second interfaces to allow the scanner to occupy the printer engine when an image obtained by the scanner is to be printed by the printer,
      wherein if a trouble occurs in the printer engine, the controller determines a characteristic of the trouble and varies a time period until the scanner's occupation of the printer engine is released according to the characteristic of the trouble.

19. A copying system according to claim 13, wherein said controller releases the scanner's occupation of the printer engine after elapse of a predetermined time period when it is determined that the trouble makes the printer engine inoperative and is difficult to be repaired by a user, and releases the scanner's occupation of the printer engine promptly when it is determined that the trouble makes the printer engine inoperative but can be easily repaired by a user.

20. A method for use with a copying system including a printer having a printer engine, a scanner directly connected with the printer, a printer controller for receiving print data via a network to which an external device is connected and for outputting the print data to the printer engine, a first interface for connecting the printer engine with the scanner, and a second interface for connecting the printer engine with the printer controller, said method comprising the steps of:

controlling the first and second interfaces to allow the scanner to occupy the printer engine when an image obtained by the scanner is to be printed by the printer; and determining, if a trouble occurs in the printer engine, a characteristic of the trouble and varying a time period until the scanner's occupation of the printer engine is released according to the characteristic of the trouble.

21. A method according to claim 20, wherein, at the step of determining, the scanner's occupation of the printer engine is released after elapse of a predetermined time period when it is determined that the trouble makes the printer engine inoperative and is difficult to be repaired by a user, and the scanner's occupation of the printer engine is released promptly when it is determined that the trouble makes the printer engine inoperative but can be easily repaired by a user.

* * * * *